No. 856,538. PATENTED JUNE 11, 1907.
C. E. LORD & W. F. BOUCHÉ.
SHAFT OSCILLATOR.
APPLICATION FILED JAN. 25, 1905.
3 SHEETS—SHEET 1.
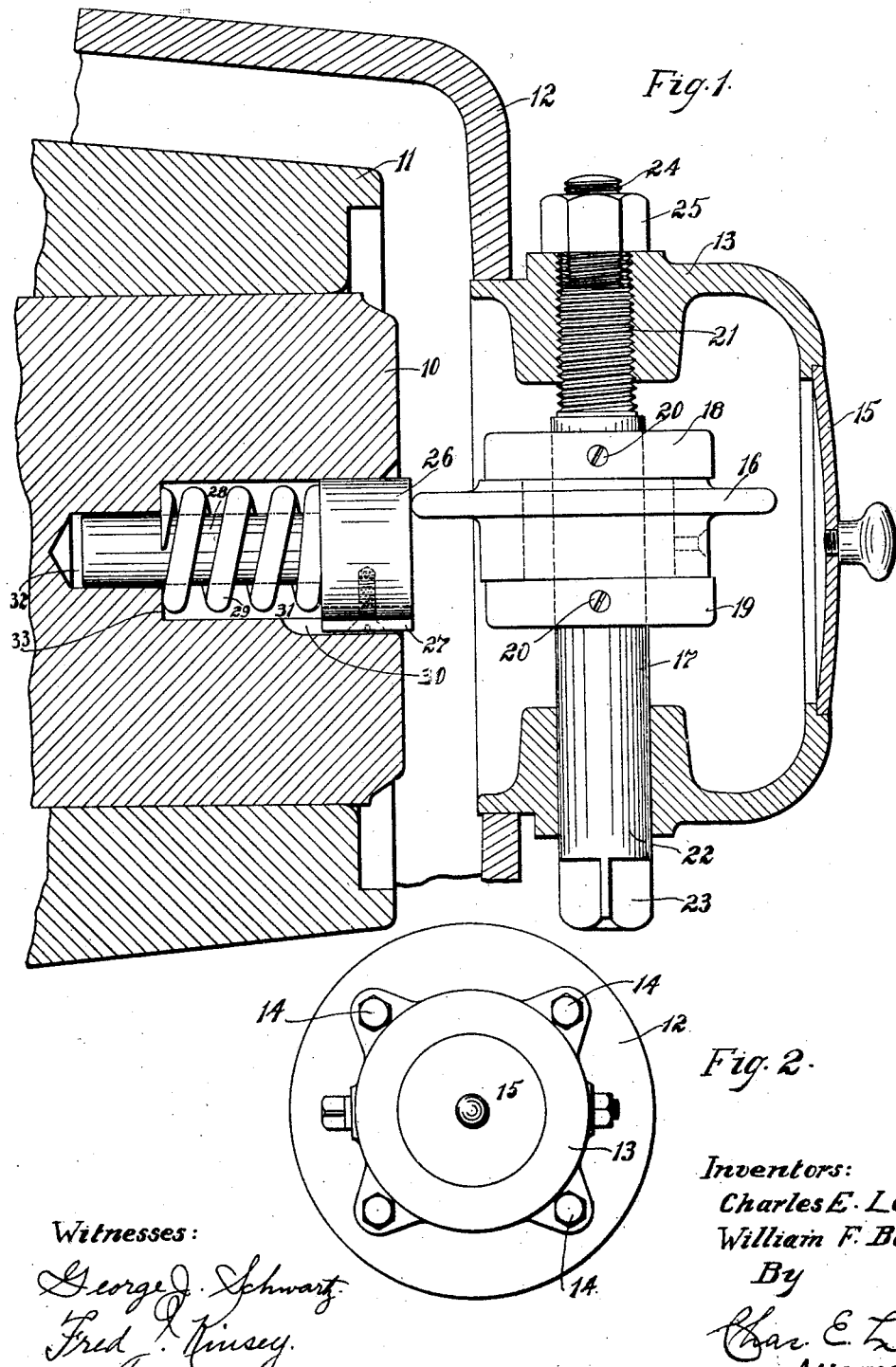
Witnesses:
George J. Schwartz
Fred J. Kinsey
Inventors:
Charles E. Lord
William F. Bouché
By
Chas. E. Lord
Attorney.

No. 856,538. PATENTED JUNE 11, 1907.
C. E. LORD & W. F. BOUCHÉ.
SHAFT OSCILLATOR.
APPLICATION FILED JAN. 25, 1905.
3 SHEETS—SHEET 2.
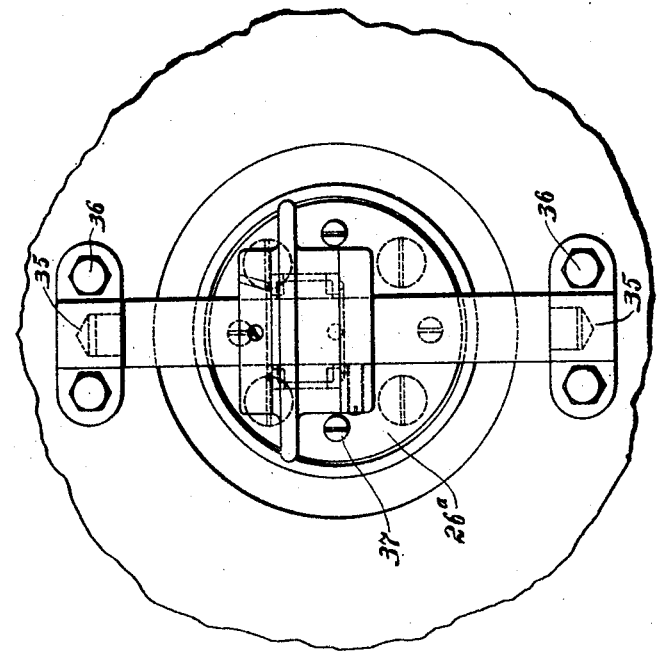
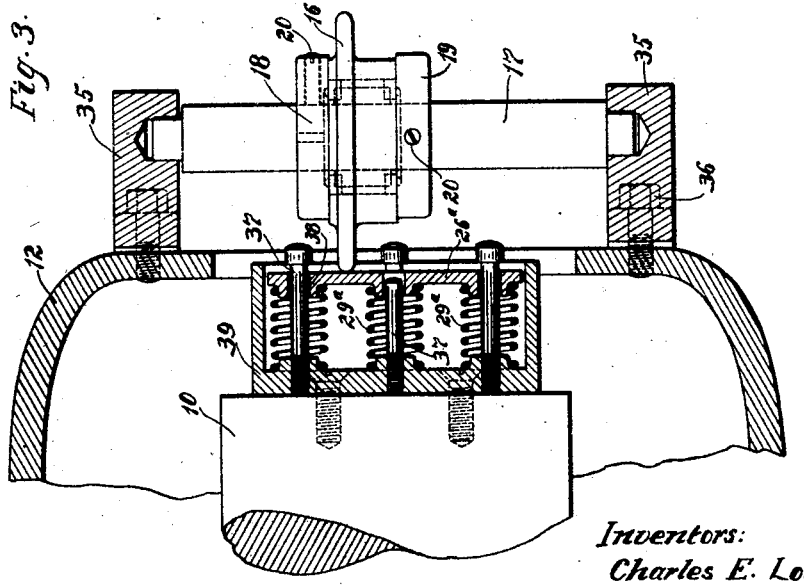
Witnesses:
George J. Schwartz.
Fred J. Kinsey.
Inventors:
Charles E. Lord.
William F. Bouché.
By
Chas. E. Lord
Attorney.

No. 856,538. PATENTED JUNE 11, 1907.
C. E. LORD & W. F. BOUCHÉ.
SHAFT OSCILLATOR.
APPLICATION FILED JAN. 25, 1905.
3 SHEETS—SHEET 3.
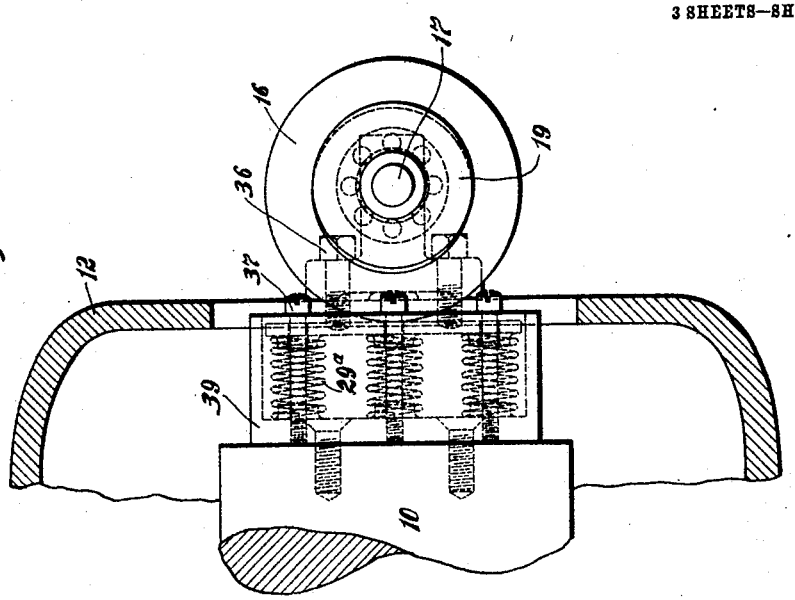
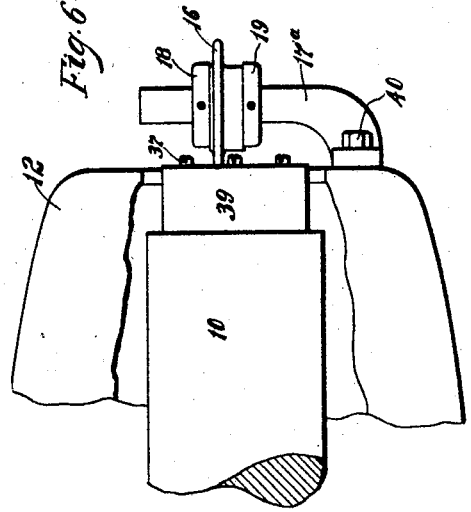
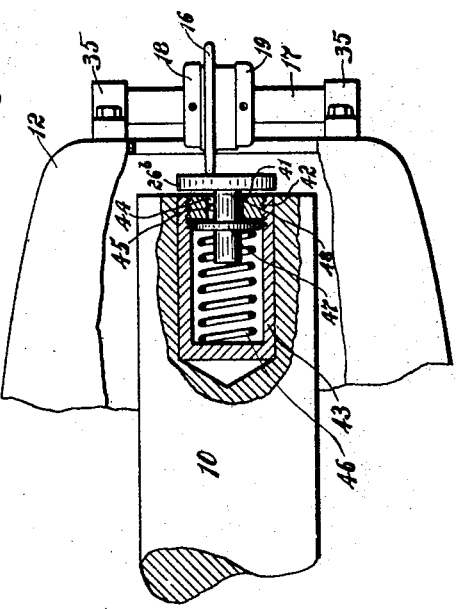
Witnesses:
George J. Schwartz.
Fred J. Kinsey.
Inventors:
Charles E. Lord.
William F. Bouché.
By
Chas. E. Lord
Attorney

UNITED STATES PATENT OFFICE.

CHARLES E. LORD AND WILLIAM F. BOUCHÉ, OF NORWOOD, OHIO, ASSIGNORS TO THE BULLOCK ELECTRIC MANUFACTURING COMPANY, A CORPORATION OF OHIO.

SHAFT-OSCILLATOR.

No. 856,538.     Specification of Letters Patent.     Patented June 11, 1907.

Application filed January 25, 1905. Serial No. 242,699.

*To all whom it may concern:*

Be it known that we, CHARLES E. LORD and WILLIAM F. BOUCHÉ, citizens of the United States, residing at Norwood, in the county of Hamilton and State of Ohio, have invented certain new and useful Improvements in Shaft-Oscillators, of which the following is a full, clear, and exact specification.

Our present invention relates to means for oscillating or reciprocating a shaft longitudinally in its bearings.

More specifically the invention relates to an oscillator for the movable element of a dynamo electric machine.

An oscillating movement given to the rotating element of a dynamo electric machine, especially rotary converters and other machines which are not belt connected, causes the shaft of said element to operate better in its bearings, and prevents the wearing of grooves and ridges in the commutator of the machine.

The object of our invention therefore, is to produce the desired results by oscillating the shaft or rotating element by means of a mechanical device which is simple in construction and effective in its operation.

To this end we employ a disk preferably made of hardened steel, phosphor bronze, or other material of good wearing qualities, eccentrically mounted on a relatively fixed spindle which is placed at an angle to the axis of rotation of the shaft and having its periphery bearing against a yieldingly mounted plate which is carried by the end of the shaft and is constrained to rotate therewith. The rapidity of oscillation of the shaft may be adjusted by changing the position of the disk on said plate relative to the axis of rotation of the shaft. By this means any desired period of oscillation may be obtained, although it is preferred that the oscillator be adjusted to produce the so-called natural period of oscillation.

In the accompanying drawings which illustrate the preferred embodiments of our invention, Figure 1 represents a sectional plan view of a shaft end and bearing of a dynamo electric machine having our improved shaft oscillator attached thereto; Fig. 2 is an end view of the oscillator shown in Fig. 1 as applied to the machine; Figs. 3, 4, and 5 are respectively sectional elevation, end elevation, and plan of a modified form of our improved shaft oscillator; Figs. 6 and 7 are side elevations partly in section of further modified forms of our invention.

Referring now to Figs. 1 and 2 of the drawings, the shaft to be oscillated is indicated by 10 and is mounted in the bearing 11, surrounded by the bearing housing 12. Fastened to the end of said bearing housing by means of the bolts 14 is a protecting casing 13 for the shaft oscillator, said casing being provided with an inspection opening normally closed by the cover 15. Mounted in bearings formed in the walls of said casing is a relatively fixed spindle 17 on which is rotatably mounted the eccentric disk 16 which may be made of hardened steel, phosphor bronze, or other equally hard material. This disk 16 may be provided with roller or ball bearings, if so desired. The disk is held against movement longitudinally on the spindle 17 by means of the collars 18 and 19, provided with set screws 20. One end of the spindle 17 is screw threaded and operates in the bearing 21 properly threaded to receive same. The extreme end of said spindle is cut to a small diameter and threaded at 24 to receive the locking nut 25. The opposite end of said spindle is finished smooth and operates in the bearing 22. The part of said spindle which projects from the last mentioned bearing is formed with a square shaped head adapted to receive a wrench or other instrument to turn said spindle to adjust the same longitudinally in its bearings.

Mounted in a recess 31 in the end of the shaft 10 is a spring pressed plate 26, against which the periphery of the eccentric disk 16 bears. This plate 26 is provided with a projection 28, which reciprocates loosely in the contracted portion 32 of the recess 31. A heavy spring 29 surrounds this projecting portion 28 and bears at one end against the inner surface of the plate 26 and at the other end against the shoulder 33. This plate 26 is also provided with a key 27, operating in the key-way 30. This arrangement permits the plate 26 to have a yielding reciprocatory motion, while at the same time said plate is constrained to rotate at a speed equal to the speed of the shaft 10. As the shaft 10 rotates, the eccentric disk 16, the periphery of which bears against the outer surface of said plate 26, forces the plate 26 to the left, compressing the spring 29. The thrust thus applied to said spring is transmitted to the shaft 10, which is then forced to the left against its normal bias. This normal bias in dynamo electric machines is produced by the action of the magnetic field in which the armature rotates and the shaft oscillator should be so mounted and adjusted that this normal bias maintains the plate 26 in contact with the periphery of the disk at all times.

The point of contact of the disk 16 with the plate 26 is out of alinement with axis of rotation of the shaft, and the distance of this point of contact from the axis of rotation determines the period of oscillation for a certain speed of the shaft. To vary this period of oscillation it is merely necessary to loosen the clamping nut 25 and rotate the spindle 17 so as to move said spindle 17 longitudinally in its bearings, thereby changing the distance between the point of contact of the disk and the axis of rotation of the shaft. This distance is preferably so adjusted as to cause the shaft to oscillate at its so-called natural period of oscillation.

In the modification illustrated in Figs. 3, 4, and 5 the spindle 17 is mounted directly in the brackets 35, fastened to the bearing housing 12 by means of the bolts 36. This spindle 17 may be mounted rotatably or fixedly in said brackets. The eccentric disk 16 is provided with roller bearings and is mounted upon the spindle 17 in a manner similar to that employed in the modification illustrated in Figs. 1 and 2, but in this case the adjustment of the oscillator is accomplished by changing the position of disk 16 longitudinally on the spindle 17. Instead of yieldingly mounting the plate in a recess in the shaft 10, we provide plate 26ᵃ with a plurality of springs 29ᵃ and a plurality of guiding pins 37, operating in openings 38 formed in said plate. This plate with its springs and guiding pins is mounted in a protecting casing 39, which is screwed, or otherwise fastened to the end of the shaft 10. When this modified form of the shaft oscillator has been properly adjusted, its operation is substantially the same as that described in connection with the form illustrated in Figs. 1 and 2.

In the modification shown in Fig. 6 we employ a spring pressed plate similar to that shown in Figs. 3, 4, and 5, but mount the eccentric disk on the upper end of the supporting bracket 17ᵃ bolted to the bearing housing at 40. In this modification, the period of oscillation is adjusted by changing the position of the eccentric disk 16 vertically on the supporting bracket 17ᵃ. This is accomplished by merely changing the position of the adjustable collars 18 and 19.

In the modification illustrated in Fig. 7, the same kind of a support for the eccentric disk 16, as that shown in Figs. 3, 4, and 5 is used, but we have illustrated a modified form of the spring pressed plate. This plate 26ᵇ is provided with an inwardly projecting extension 48 capable of reciprocating in an opening 41 formed through the cover 42. This cover is screwed into the outer end of the cylindrical casing 43 which fits tightly in a recess in shaft 10 and rotates with said shaft. The cover 42 is also provided with a key-way 44 in which the pin 45 operates, thereby constraining the plate 26ᵇ to rotate with the shaft 10. The cylindrical casing 43 also contains the spring 46, which bears against the collar 47, carried by the extension 48 and through which the thrust of disk 16 is transmitted to shaft 10.

When the eccentric disk 16 is properly adjusted the modifications illustrated in Figs. 6 and 7 operate in substantially the same manner as before described. As the shaft 10 rotates, the eccentric disk 16 will be forced to rotate on its supporting spindle, and as said disk changes from a position in which the distance from its axis of rotation to the contact point is a minimum to a position in which the distance from said axis of rotation to the contact point is a maximum, the shaft 10 will be thrust to the left, or away from said supporting spindle. This thrust may be opposed by the action of gravity, by the magnetic pull between the rotating member and the stationary member of the dynamo electric machine, or in any other desired manner. As the disk 16 continues its rotation, the shaft 10 will be permitted to return to its initial position under the action of said opposing force.

In the appended claims, our aim is to cover all modifications of the devices herein illustrated and described which do not involve a departure from the spirit and scope of our invention.

Having thus described our invention, what we claim as new, and desire to secure by Letters Patent is:—

1. In combination, a shaft, a yielding member mounted upon the end of said shaft, and a shaft oscillator comprising a member eccentrically mounted adjacent the end of the shaft, and having its periphery in engagement with said yielding member.

2. In combination, a shaft, a member yieldingly mounted upon the end of said shaft, and a shaft oscillator comprising a disk eccentrically mounted adjacent the end of said shaft, and having its periphery in engagement with said yieldingly mounted member.

3. In combination, a shaft, a plate yieldingly mounted upon the end of said shaft, and a shaft oscillator comprising a rotatable member eccentrically mounted on a relatively fixed spindle at right angles to said shaft, and having its periphery in engagement with said plate.

4. In combination, a shaft, a plate yieldingly mounted upon the end of said shaft and rotatable therewith, an eccentric member rotatably mounted upon a relatively fixed spindle, and having its periphery engaging said plate in such a manner that the rotation of the latter will cause said eccentric member to rotate and oscillate said shaft.

5. In combination, a shaft, a spring-pressed plate operatively related to said shaft and constrained to rotate therewith, an eccentrically mounted member having its periphery engaging said plate at a point out of alinement with the axis of rotation of said shaft so as to oscillate the shaft as it rotates, and means for adjusting the position of said member so that the period of oscillation of the shaft may be varied.

6. In combination, a shaft, a spring-pressed plate operatively related to said shaft and constrained to rotate therewith an eccentrically mounted member having its periphery engaging said plate at a point out of alinement with the axis of rotation of said shaft so as to oscillate the shaft as it rotates, means for adjusting the position of said member so that the period of oscillation of the shaft may be varied, a protecting casing for the oscillator, and a removable cover for said casing.

7. In combination, a shaft, a spring-pressed plate operatively related to said shaft and constrained to rotate therewith, an eccentrically mounted member having its periphery engaging said plate at a point out of alinement with the axis of rotation of said shaft so as to oscillate the shaft as it rotates, and a spindle on which said member is rotatably mounted, said spindle being so constructed and arranged that a movement of same longitudinally in its bearings will change the position of said member relative to said plate, thus varying the period of oscillation of the shaft.

8. The combination of a shaft having a normal endwise bias, with means for shifting said shaft against said bias, comprising a plate yieldingly mounted in the end of said shaft, and an eccentric disk rotatably mounten upon a relatively fixed spindle and bearing against said plate.

9. The combination of a shaft having a normal endwise bias, with means for shifting said shaft against said bias, comprising a plate yieldingly mounted in the end of said shaft, an eccentric disk rotatably mounted upon a relatively fixed spindle and bearing against said plate, and means for adjusting said spindle longitudinally in its supports to change the position of said disk relative to the axis of rotation of said plate.

In testimony whereof we affix our signatures, in the presence of two witnesses.

CHARLES E. LORD.
WILLIAM F. BOUCHÉ.

Witnesses:
H. L. VAN VALKENBURG,
FRED J. KINSEY.